(12) United States Patent
Neyama et al.

(10) Patent No.: US 11,943,687 B2
(45) Date of Patent: Mar. 26, 2024

(54) DATA COLLECTION SYSTEM AND DATA COLLECTION METHOD

(71) Applicant: TOYOTA JIDOSHA KABUSHIKI KAISHA, Toyota (JP)

(72) Inventors: Ryo Neyama, Tokyo-to (JP); Akira Yoshioka, Tokyo-to (JP); Jun Koreishi, Musashino (JP); Akihisa Yokoyama, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 783 days.

(21) Appl. No.: 16/888,097

(22) Filed: May 29, 2020

(65) Prior Publication Data

US 2020/0382926 A1  Dec. 3, 2020

(30) Foreign Application Priority Data

May 29, 2019 (JP) ................. 2019-100385

(51) Int. Cl.
*H04W 4/44* (2018.01)
*G01C 21/32* (2006.01)

(52) U.S. Cl.
CPC .............. *H04W 4/44* (2018.02); *G01C 21/32* (2013.01)

(58) Field of Classification Search
CPC ................................ G01C 21/32; H04W 4/44
See application file for complete search history.

(56) References Cited

U.S. PATENT DOCUMENTS

| 2018/0038709 A1 | 2/2018 | Takahashi |
| 2018/0288502 A1 | 10/2018 | Higuchi et al. |
| 2019/0121798 A1* | 4/2019 | Schechter .............. G01C 21/34 |

FOREIGN PATENT DOCUMENTS

| JP | 2012-168796 A | 9/2012 | |
| JP | 2012168796 A * | 9/2012 | .......... G08G 1/0112 |
| JP | 2016125952 A * | 7/2016 | |
| JP | 2018-025865 A | 2/2018 | |
| JP | 2018-166292 A | 10/2018 | |

* cited by examiner

*Primary Examiner* — Charles J Han
(74) *Attorney, Agent, or Firm* — Oliff PLC

(57) ABSTRACT

A data collection system includes a server device and at least one probe vehicle. The server device includes a storage unit configured to store a master map in which a necessity of data collection for each of a plurality of unit ranges included in a plurality of segments is represented by a binary value; and a server control unit configured to extract from the master map a segment corresponding to a position of the probe vehicle, and to transmit the segment to the probe vehicle as a partial map. The probe vehicle includes a data obtaining unit configured to obtain the data; and a vehicle control unit configured to identify a unit range requiring data collection based on the partial map received from the server device, and to transmit the data obtained in the unit range to the server device.

9 Claims, 10 Drawing Sheets

DATA COLLECTION SYSTEM AND DATA COLLECTION METHOD

CROSS REFERENCE TO THE RELATED APPLICATION

This application claims the benefit of Japanese Patent Application No. 2019-100385, filed on May 29, 2019, which is hereby incorporated by reference herein in its entirety.

BACKGROUND

Technical Field

The present disclosure relates to a data collection technique using vehicles.

Description of the Related Art

In recent years, as vehicles connected to networks (hereinafter, also referred to as connected vehicles) are becoming popular, consideration is being made of a system for collecting data using vehicles during travel. By collecting data obtained by the vehicles during travel, applications of the data will be expected such as automatic creation of road map data becoming possible, for example.

As a technology related to this, for example, in Patent Literature 1, there is disclosed a system in which a map indicating whether or not data collection is necessary is delivered from a server to a vehicle, and the vehicle performs data collection based on the map thus delivered.

CITATION LIST

Patent Literature 1: Japanese patent application laid-open publication No. 2018-25865

SUMMARY

In the system described in Patent Literature 1, it is necessary to deliver a map corresponding to a range in which a vehicle is traveling to the vehicle. However, there are a countless or great number of roads on which the vehicle is able to travel, so it is not realistic to show all such roads on a map. In addition, the cost required to update the map increases as the size of the map becomes larger.

The present disclosure has been made in the consideration of the above-mentioned problems, and has for its object to optimize the collection of data in a system collecting data obtained by a vehicle.

The present disclosure in its one aspect provides a data collection system comprising a server device and at least one probe vehicle, wherein the server device collects data obtained by the probe vehicle, the server device comprising: a storage unit configured to store a master map in which a necessity of data collection for each of a plurality of unit ranges included in a plurality of segments is represented by a binary value; and a server control unit configured to extract from the master map a segment corresponding to a position of the probe vehicle, and to transmit the segment to the probe vehicle as a partial map; the probe vehicle comprising: a data obtaining unit configured to obtain the data; and a vehicle control unit configured to identify a unit range requiring data collection based on the partial map received from the server device, and to transmit the data obtained in the unit range to the server device.

The present disclosure in its another aspect provides a data collection method to be performed by a data collection system which includes a server device and at least one probe vehicle, wherein the server device collects data obtained by the probe vehicle, the method configured such that: the server device executes: a step of obtaining a master map in which a necessity of data collection for each of a plurality of unit ranges included in a plurality of segments is represented by a binary value; and a step of extracting from the master map a segment corresponding to a position of the probe vehicle, and transmitting the segment to the probe vehicle as a partial map; the probe vehicle executes: a step of obtaining the data; and a step of identifying a unit range requiring data collection based on the partial map received from the server device, and transmitting the data obtained in the unit range to the server device.

In addition, another aspect of the present disclosure resides in a program for making a computer execute the above-mentioned control method, or a computer readable storage medium having the program stored thereon in a non-transitory manner.

According to the present disclosure, the collection of data can be optimized in a system collecting data obtained by a vehicle.

DESCRIPTION OF THE EMBODIMENTS

Figure 1:
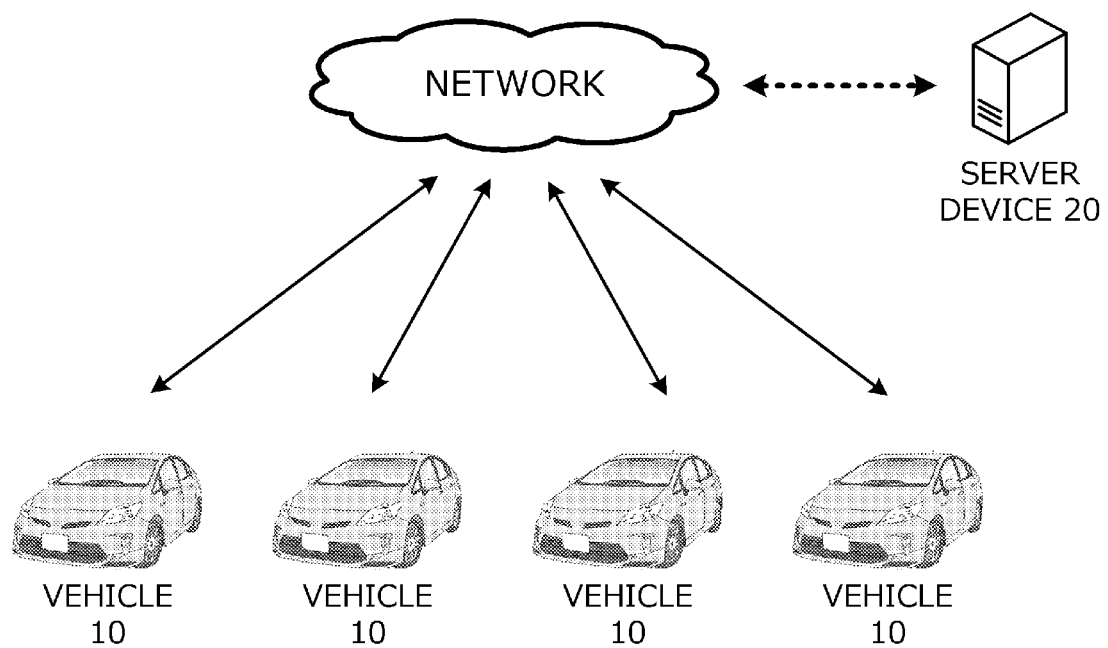
FIG. 1 is a schematic view of a data collection system according to the present disclosure.

A data collection system according to the present disclosure is a system in which a server device collects data obtained by a plurality of vehicles (i.e., probe vehicles) traveling on a road. The date may be image data, sensor data or the like, as long as the data can be obtained by the vehicles. Each of the vehicles has a function of obtaining data during travel, and transmitting the data to the server device.

In such a system, there may arise a case where a lot of duplicate data will be transmitted to the server device depending on the volume of passing traffic, thereby putting pressure on network resources.

Accordingly, in the data collection system according to the present disclosure, the server device transmits to a vehicle a map showing a plurality of unit ranges in which data should be collected, and the vehicle decides, based on the information described in the map, the data to be transmitted to the server device among the data obtained.

Specifically, the server device has stored a master map in which a necessity of data collection for each of a plurality of unit ranges included in a plurality of segments is represented by a binary value, wherein the server device extracts from the master map a segment corresponding to the position of a probe vehicle, and transmits it to the probe vehicle as a partial map.

In addition, the probe vehicle identifies, based on the partial map received from the server device, a unit range requiring data collection, and transmits the data obtained in the unit range to the server device.

According to such a configuration, each map indicating the necessity of data collection can be transmitted and received in units of segment, so it is possible to attain a reduction in the amount of data. In addition, a partial map can be replaced with another one in units of segment, version management of a map can be performed relatively easily.

Moreover, the master map may be a map in which in cases where collection of data is necessary in any place within the unit range, a true value is associated with the unit range, but otherwise, a false value is associated with the unit range, and that in cases where one unit range is associated with a true value, the vehicle control unit may transmit the data obtained in this unit range to the server device.

In this manner, compressibility can be improved by setting a bit according to the necessity of data collection. For example, as a compression method for a partial map, there can be adopted a well-known binary image compression method.

Further, in cases where the vehicle control unit has not a partial map corresponding to at least one segment existing in the vicinity of a subject (own) vehicle, the vehicle control unit may request the partial map corresponding to this segment to the server device.

According to such a configuration, only a necessary portion of the master map managed by the server device can be transmitted from the server device to the vehicle. The at least one segment existing in the vicinity of the subject vehicle may be only a segment to which the subject vehicle belongs, or may be a plurality of segments including a segment to which the subject vehicle belongs.

In addition, the server device may further comprise an update unit configured to update the master map according to a collection situation of the data, wherein each time the master map is updated, the server control unit may apply a version number to each of the partial maps, and transmit both of the partial maps and their version numbers to the probe vehicle.

In this manner, the master map may be updated according to the collection situation of the data. In this case, by applying a version number to a partial map, it becomes possible to grasp the latest data collection situation at the vehicle side. The version number can be, for example, a numerical value, which is incremented upon each occurrence of an update.

Moreover, in cases where the vehicle control unit has a partial map corresponding to at least one segment existing in the vicinity of the subject vehicle, the vehicle control unit may transmit a version number of the partial map corresponding to this segment to the server device, and the server control unit may determine, based on the version number, whether the update of the partial map corresponding to the segment which the probe vehicle has is necessary.

By transmitting the version number from the vehicle to the server device, the server device can detect whether the partial map which the vehicle has is old. When the vehicle is using the map of an old version, there is a fear of transmitting information already unnecessary for the server device, and hence, the server device may update the partial map based on the result of detection.

Further, the vehicle control unit may perform the transmission of the version number at the timing of transmitting the data obtained to the server device.

Hereinafter, specific embodiments of the present disclosure will be described based on the attached drawings. However, hardware configurations, module configurations, functional configurations and so on described in the respective embodiments are not intended to limit the technical scope of the present disclosure to these alone in particular as long as there are no specific statements.

First Embodiment

The configuration schematic of a data collection system according to a first embodiment of the present disclosure is illustrated in FIG. 1. The data collection system according to this embodiment is composed of a plurality of vehicles 10 and a server device 20. The server device 20 is a device that manages the plurality of vehicles 10 which are under the control of the server device 20. Each of the vehicles 10 is a connected car (probe vehicle) that can communicate with the server device 20 and can perform a function to be described later. Here, note that in FIG. 1, the one server device 20 is exemplified, but the server device 20 may be plural. In addition, the number of the vehicles 10 is also not limited to the number illustrated.

Each of the vehicles 10 according to this embodiment has a function of obtaining an image outside the vehicle by using a camera mounted on the vehicle and storing it as image data, as well as a function of transmitting the image data thus obtained to the server device 20. The server device 20 has a function of collecting the image data obtained by the vehicles 10, and creating a road map by analyzing the image data. The transmission of the image data from the vehicles 10 to the server device 20 is controlled by the map created by the server device 20.

In the following description, the map managed by the server device 20 (i.e., a master map in the present disclosure) is referred to as a master partition table, and those which are obtained by dividing the master partition table into segments (i.e., partial maps in the present disclosure) are referred to as partial partition tables.

Here, note that in this embodiment, the image data obtained by each of the vehicles 10 is transmitted to the server device 20 as it is, but the transmission is not necessarily limited to this mode. For example, the vehicles 10 may perform conversion from the image data to a characteristic quantity, and may also transmit the characteristic quantity thus converted to the server device 20. In addition, sensor data obtained by sensing a road may also be transmitted to the server device 20. In the description of this embodiment, "image data" and "data" are equivalent to each other.

In the system in which the server device collects the data obtained by the plurality of vehicles 10, it is necessary to perform control so as to prevent an excessive amount of data from being transmitted from the vehicles 10. This is because in cases where such control is not performed, duplicate data (e.g., substantially the same data obtained at the same point or location) will be transmitted from the different vehicles 10, whereby network resources may be strained.

In the data collection system according to the first embodiment, in order to solve such a problem, the server device 20 stores a map (master partition table) for instructing data collection in a target area to the vehicles 10 and divides the master partition table into a plurality of segments, after which a partial partition table corresponding to a segment (or nearby segment) to which an optional vehicle 10 belongs is transmitted to the optional vehicle 10.

Based on the information described in the partial partition table received, the vehicle 10 decides image data to be transmitted to the server device 20.

In the data collection system according to this embodiment, the vehicles 10 and the server device 20 are mutually connected to one another through a network. For the network, there may be adopted a WAN (Wide Area Network), which is a public communication network on a worldwide scale such as for example the Internet, or other communication networks. In addition, the network may also include a telephone communication network such as a cellular or mobile phone network or the like, a radio or wireless communication network such as Wi-Fi (registered trademark) or the like.

Figure 2:
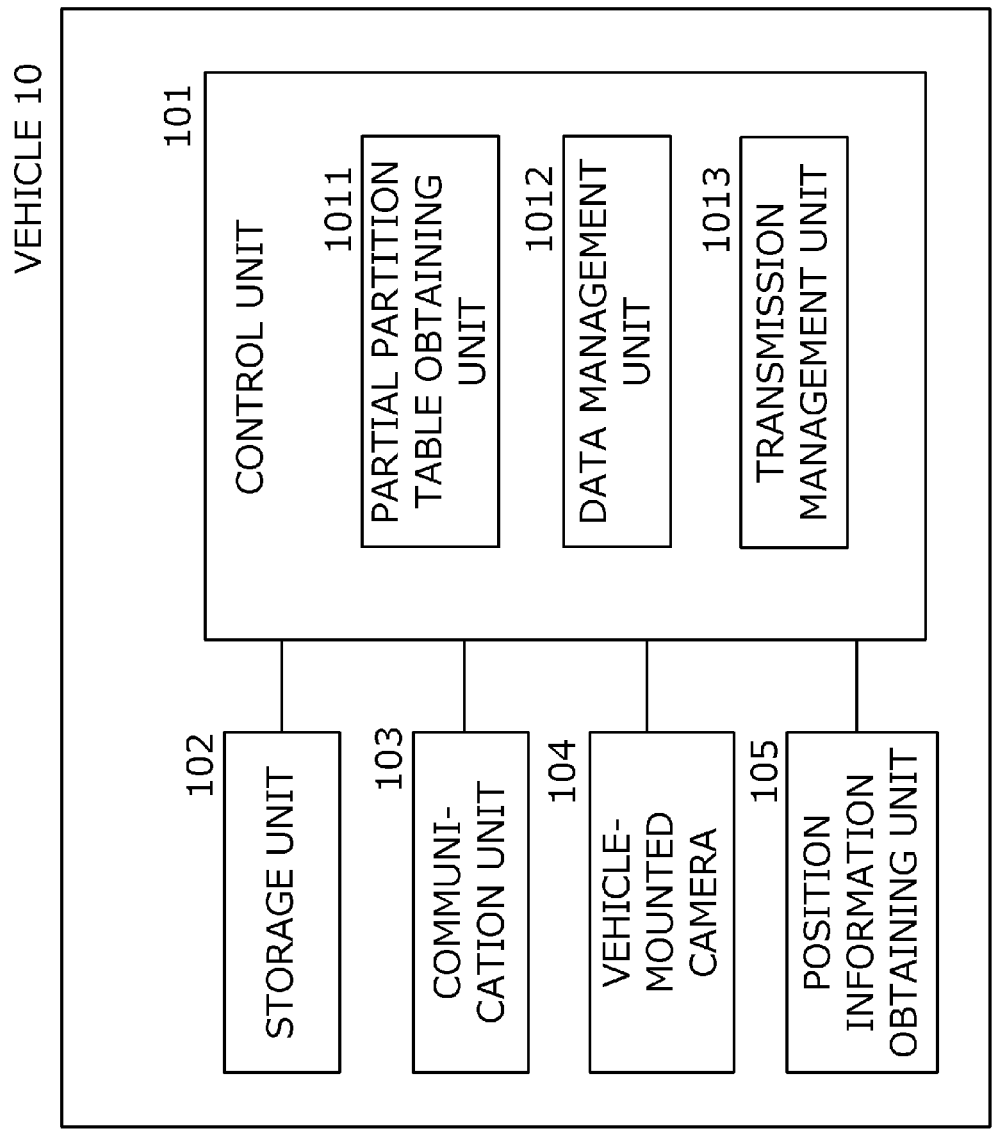
FIG. 2 is a configuration view of a vehicle 10 according to a first embodiment of the present disclosure.

Next, the configuration of a vehicle 10 will be described. FIG. 2 is a view illustrating the system configuration of the vehicle 10. The vehicle 10 is composed of including a control unit 101, a storage unit 102, a communication unit 103, a vehicle-mounted camera 104, and a position information obtaining unit 105.

The control unit 101 is an arithmetic unit that manages, among functions of the vehicle 10, a function of obtaining and managing image data, and a function of transmitting the image data obtained. The control unit 101 can be achieved by an operation processing unit such as a CPU (Central Processing Unit).

The control unit 101 is composed of including three functional modules, i.e., a partial partition table obtaining unit 1011, a data management unit 1012, and a transmission management unit 1013. Each of these individual functional modules may be achieved by executing a program (s) stored in a storage unit 102 to be described later by the CPU.

Before explaining each module of the control unit 101, reference will be made to a master partition table managed by the server device 20, and a partial partition table to be transmitted from the server device 20 to the vehicle 10.

Figure 3A:
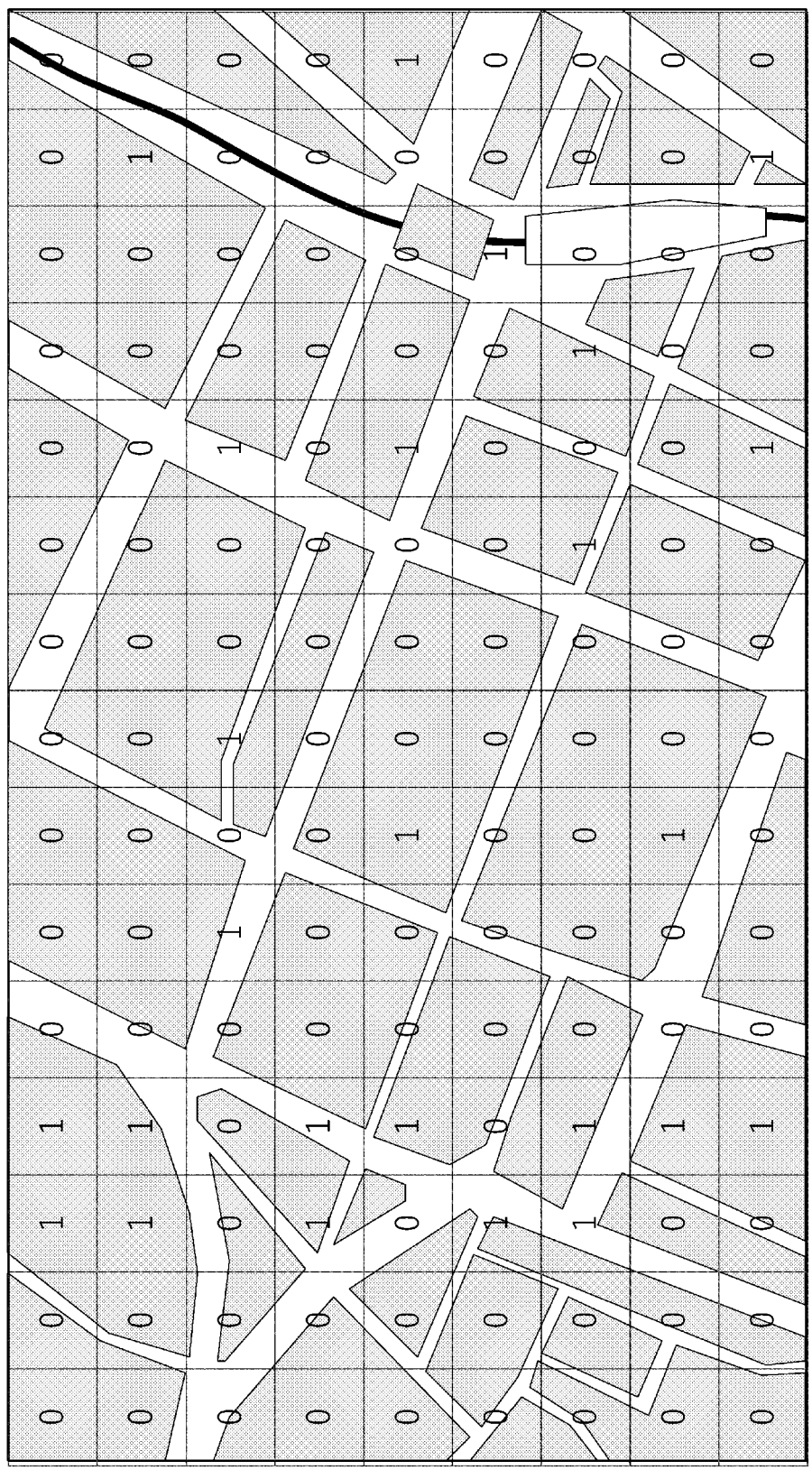
FIG. 3A is a view explaining a master partition table managed by a server device.

FIG. 3A is a view visually illustrating a part of the master partition table.

The master partition table is a map in which a target area for collecting image data is divided into a plurality of unit ranges. In this embodiment, a flag indicating the necessity of data collection (hereinafter, a necessity flag) is associated with each of the plurality of unit ranges. Each unit range can be defined, for example, by a mesh of 50$m$ square, but it is not limited to this. Hereinafter, a unit range is referred to as a mesh.

Figure 3B:
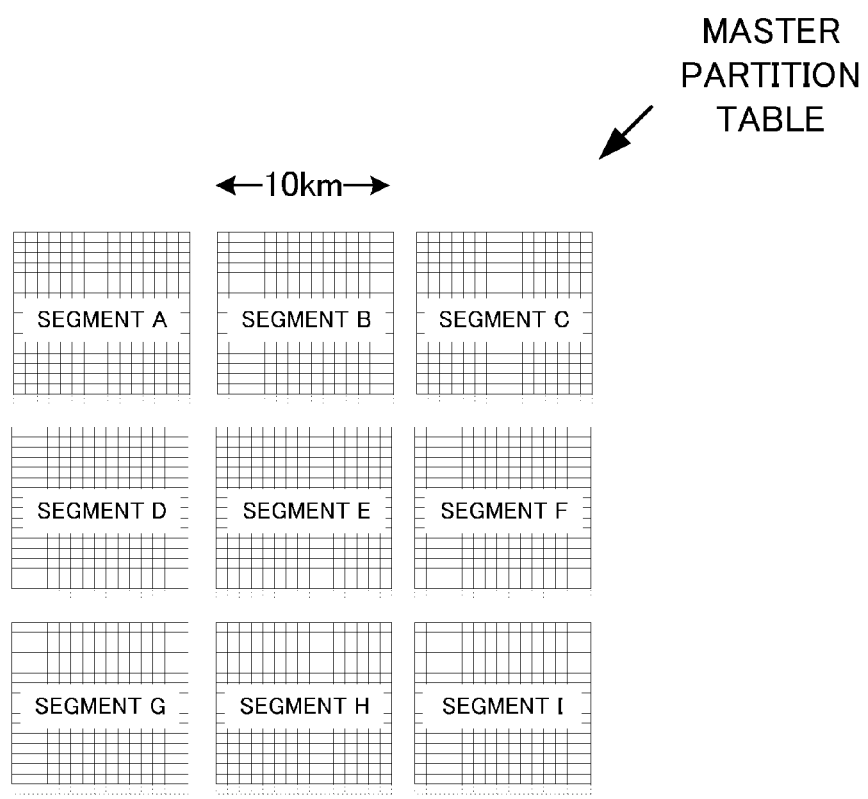
FIG. 3B is a view explaining another master partition table managed by the server device.

The master partition table is configured to be capable of being divided into a plurality of segments each having a predetermined size. FIG. 3B is a view explaining segments constituting the master partition table. Although a segment can be formed into a rectangular area of 10 km square, for example, the size and shape thereof are not limited to specific ones. The size of a segment should only be suitably set according to, for example, the capacity of a storage device mounted on the vehicle 10, the frequency of communication with the server device, the speed of transmission, the speed of the movement of the vehicle 10, etc.

In cases where each segment is 10 km square and each mesh is 50 m square, one segment includes 40,000 meshes.

In order to reduce data volume, the server device 20 according to this embodiment specifies one or more segments corresponding to the vehicle 10 from the master partition table, creates the data included in the segment as a partial partition table, and thereafter transmits it to the vehicle 10. For example, in cases where the vehicle 10 exists in a segment E illustrated in FIG. 3B, a partial partition table corresponding to the segment E is transmitted to the vehicle 10.

The one or more segments corresponding to the vehicle 10 may be, for example, a segment in which the vehicle 10 is located, or a plurality of segments which can be reached by the vehicle 10 within a predetermined period of time.

The partial partition table thus transmitted is obtained by the partial partition table obtaining unit 1011.

In cases where it is necessary to obtain certain data in a corresponding mesh, the necessity flag is set to a true value (1), whereas in cases where it is not necessary to obtain data, the necessity flag is set to a false value (0). For example, in cases where the obtaining of data is performed in units of a road link (a road segment), and in cases where the obtaining of data is unnecessary in any point on the roads included in a mesh, the necessity flag is set to 0, whereas in other cases, the necessity flag is set to 1.

The data management unit 1012 obtains image data, and manages the image data obtained. Specifically, at a predetermined period, the data management unit 1012 performs the processing of obtaining images outside the vehicle through the vehicle-mounted camera 104, and storing them in the storage unit 102, and also performs the processing of deleting unnecessary data among the image data stored in the storage unit 102.

The transmission management unit 1013 extracts image data stored in the storage unit 102 based on the received partial partition table, and performs the processing of transmitting the image date thus extracted to the server device 20.

A detailed method thereof will be described later.

The storage unit 102 is composed of including a main memory or storage device and an auxiliary storage device. The main memory device is a memory in which control programs to be executed by the control unit 101 and data to be utilized by the control programs are developed. The auxiliary storage device is a device in which the programs to be executed in the control unit 101 and the data to be utilized by the control programs are stored. An operating system for executing the programs may be stored in the auxiliary storage device. The above-mentioned functions are achieved by the programs, which have been stored in the auxiliary storage device, being loaded to the main memory device and being executed by the control unit 101.

In addition, the storage unit 102 temporarily stores the image data obtained by the above-mentioned data management unit 1012. In the following, a range of the storage unit 102 in which the image data is stored is referred to as an image storage.

The communication unit 103 is a radio communication interface for connecting the vehicle 10 to the network. The communication unit 103 provides access to the network, for example, through a wireless LAN and/or a mobile communication service such as 3G, LTE, etc.

The vehicle-mounted camera 104 is a camera capable of photographing the outside of the vehicle 10. The vehicle-mounted camera may be arranged in any position or location, as long as it can photograph a road on which the vehicle 10 is running.

The position information obtaining unit 105 is a unit that obtains the position information of the vehicle 10. The position information obtaining unit 105 is composed of including a GPS module, for example, and obtains the position information (e.g., latitude and longitude) of the vehicle 10.

Here, note that the configuration illustrated in FIG. 2 is an example, and all or part of the illustrated functions may be carried out by using a circuit(s) designed for exclusive use. Also, the storage and/or execution of the programs may be carried out by a combination(s) of a main memory device and an auxiliary storage device(s) other than the one illustrated.

Next, the configuration of the server device 20 will be described.

Figure 4:
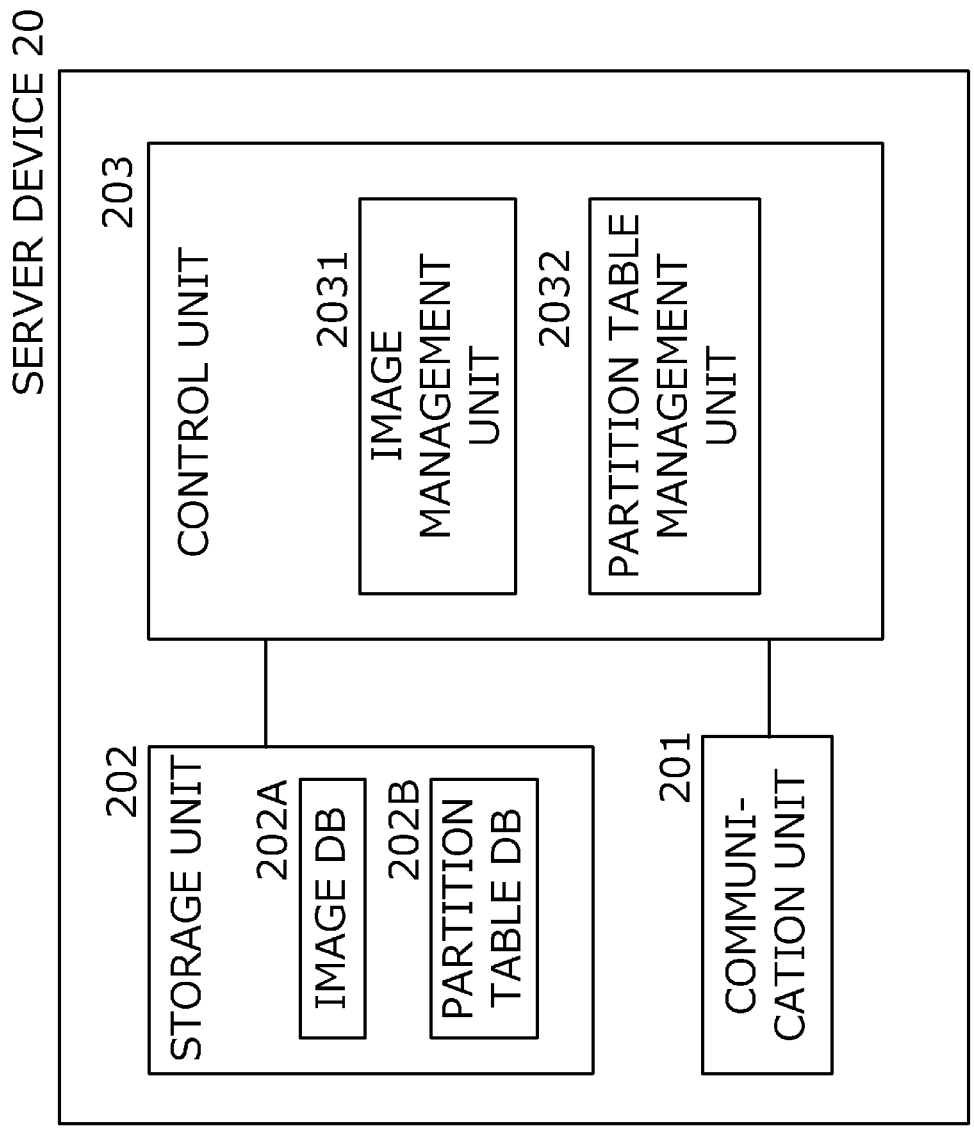
FIG. 4 is a configuration view of the server device 20 according to the first embodiment of the present disclosure.

FIG. 4 is a view illustrating a system configuration of the server device 20. The server device 20 is composed of including a communication unit 201, a storage unit 202, and a control unit 203.

The server device 20 is composed by a general or common computer. That is, the server device 20 is a computer that includes a processor such as a CPU, a GPU or the like, a main memory device such as a RAM, a ROM or the like, and an auxiliary storage device such as an EPROM, a hard disk drive, a removable medium or the like. Here, note that the removable medium may be, for example, a USB memory or a disk recording medium such as a CD, a DVD, etc. An operating system (OS), various kinds of programs, various kinds of tables, etc., are stored in the auxiliary storage device, so that individual functions corresponding to predetermined purposes, respectively, which will be described later, can be achieved by loading the programs thus stored in the auxiliary storage device to a working area of the main memory device, executing them, and controlling the individual component units through the execution of the programs. However, a part or all of the functions may be achieved by a hardware circuit (s) such as an ASIC, an FPGA, or the like. Here, note that the server device 20 may be composed of a single computer, or may be composed of a plurality of computers that cooperate with one another.

The communication unit 201 is a communication interface for connecting the server device 20 to the network. The communication unit 201 is composed of including a network interface board and/or a radio (wireless) communication circuit for radio (wireless) communication, for example.

The storage unit 202 is composed including a main memory device and an auxiliary storage device. The main memory device is a memory in which control programs to be executed by the control unit 203 and data to be utilized by the control programs are developed. The auxiliary storage device is a device in which the programs to be executed in the control unit 203 and the data to be utilized by the control programs are stored. The main memory device and the auxiliary storage device of the storage unit 202 are the same as those in the storage unit 102, so a detailed explanation thereof is omitted.

Further, the storage unit 202 is composed of including an image database 202A and a partition table data base 202B.

The image database 202A is a database that stores image data collected from the vehicle 10.

The partition table data base 202B is a database that stores a master partition table for creating partial partition tables to be distributed to the vehicle 10.

These databases are built by a program(s) of a database management system (DBMS) that is executed by the processor so as to manage the data stored in the storage devices. The databases used in this embodiment are relational databases, for example.

The control unit 203 is an arithmetic unit that manages the control performed by the server device 20. The control unit 203 can be achieved by an operation processing unit such as a CPU.

The control unit 203 is composed of including two functional modules of an image management unit 2031 and a partition table management unit 2032. Each of these functional modules may be achieved by executing programs stored in the auxiliary storage unit by the CPU.

The image management unit 2031 collects image data from a plurality of vehicles 10, and manages them using the image database 202A.

Based on the master partition table stored in the partition table data base 202B, the partition table management unit 2032 creates and transmits partial partition tables to be distributed to the plurality of vehicles 10.

The specific processing thereof will be described later.

Now, reference will be made to the outline of the processing in which the vehicle 10 collects image data.

During traveling, the vehicle 10 (the data management unit 1012) obtains image data through the vehicle-mounted camera in a periodic manner, and adds them to an obtained buffer in the storage unit 102 in a sequential manner. In this case, the data management unit 1012 associates an identifier for identifying a segment (hereinafter, a segment ID), an identifier for specifying a mesh in the segment (hereinafter, a mesh ID), and a data obtaining time point, with each piece of the image data. The segment ID and the mesh ID may be specified based on the data obtained beforehand from the server device 20. For example, at the timing of receiving a partial partition table, a segment ID and data on meshes (the position, ID, etc., of each mesh) corresponding to the partial partition table may be obtained.

The image data added to the obtained buffer are moved to the image storage in the storage unit 102 in a sequential manner. In this case, in cases where there is no space in the image storage, the image data therein may be organized or disposed according to a predetermined rule (e.g., deleted from older data, or deleted from less rare data, or the like).

Next, reference will be made to the processing to be performed by a vehicle 10 and the server device 20, while referring to FIG. 5. This processing is divided into one processing in which the server device 20 transmits a partial partition table to the vehicle 10, and another processing in which the vehicle 10 transmits image data stored in the image storage to the server device 20 based on the partial partition table thus received.

Figure 5:
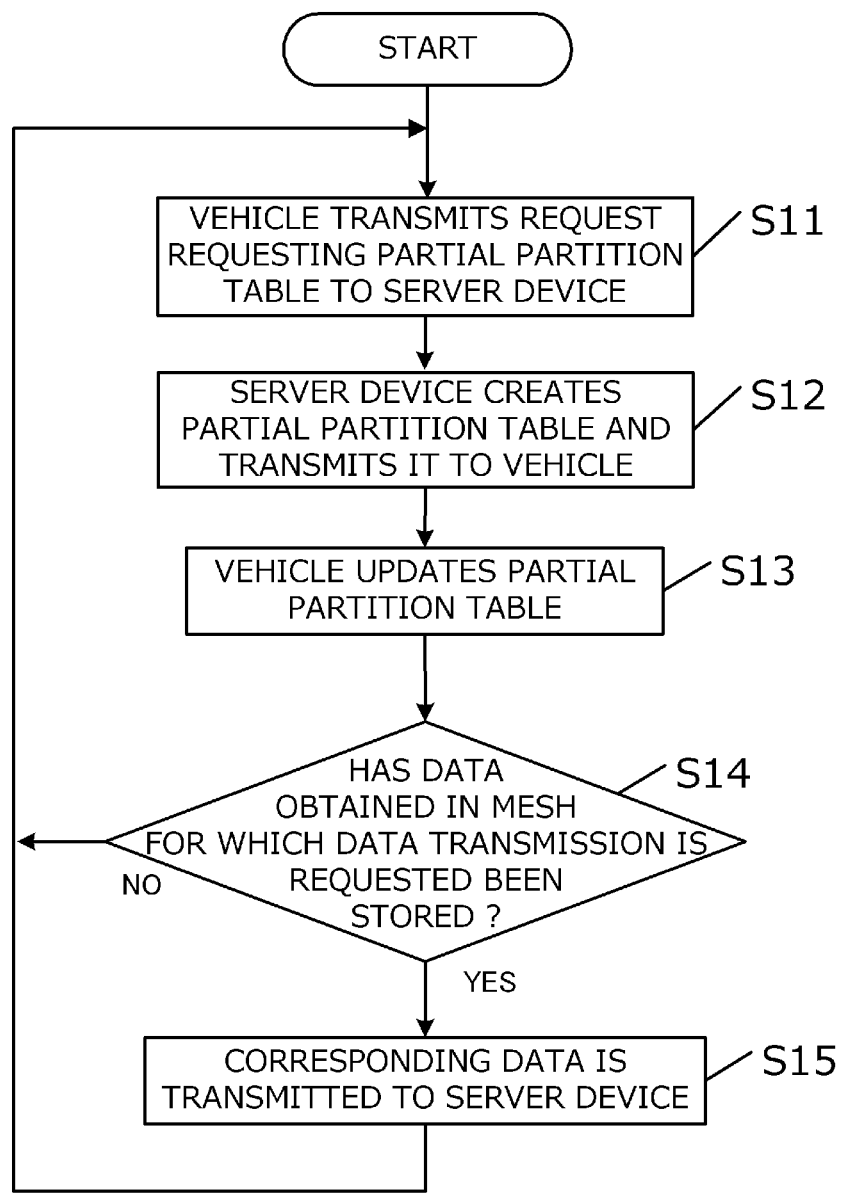
FIG. 5 is a flowchart of processing in the first embodiment of the present disclosure.

The processing illustrated in FIG. 5 may be carried out at a predetermined interval, or may be carried out each time a predetermined event occurs, while the vehicle 10 is traveling. For example, it may be carried out each time the ignition of the vehicle 10 is turned on.

Here, it is assumed that during traveling, the vehicle 10 obtains image data in a periodic manner, and stores them in the image storage by the data management unit 1012. A segment ID and a mesh ID are associated with each piece of the image data stored, as mentioned above.

First, at step S11, the vehicle 10 (the partial partition table obtaining unit 1011) transmits a request for requesting a partial partition table to the server device 20 (the partition table management unit 2032). This request includes a segment ID indicating a segment (hereinafter, a requested segment) for which the partial partition table is requested.

The requested segment can be decided based on the position information of the vehicle 10 or a scheduled travel route thereof, for example.

The requested segment may be a segment in which the vehicle 10 exists, or may be a set of segments which can be reached by the vehicle 10 within a predetermined period of time.

The segment ID may be specified based on the data obtained beforehand from the server device 20, as mentioned above. For example, a function or the like of converting latitude and longitude into a hash value or an address assigned in the master partition table may be obtained in advance and used.

Subsequently, at step S12, the server device 20 (the partition table management unit 2032) extracts from the master partition table a range (segment(s)) to be transmitted to the vehicle 10 based on the segment ID of the received requested segment, and creates a partial partition table.

A necessity flag for each mesh is associated with the partial partition table, as illustrated in FIG. 3A.

It is preferable that the partial partition table to be transmitted to the vehicle 10 include only those segments to which the vehicle 10 can reach in a predetermined period of time (e.g., until the next update timing of the partial partition table). Such a range can be estimated based on the position information of the vehicle 10 or the scheduled travel route thereof, for example.

Then, the server device 20 (the partition table management unit 2032) transmits the created partial partition table to the vehicle 10. In this step, the partial partition table is handled as an binary image, and the partial partition table is compressed by a well-known image compression method. As a method of compressing the binary image, there can be utilized ITU-T Rec.T. 6, for example, which is a data compression method for facsimile (G3), but methods other than this can also be used as long as they are data compression methods optimized for binary images.

The partial partition table transmitted to the vehicle 10 is stored in the storage unit 102 (step S13). In this case, in cases where the partial partition table corresponding to the same segment is already stored, it is overwritten.

Thereafter, by referring to one or more partial partition tables already stored, the transmission management unit 1013 determines whether image data obtained in a mesh for which data transmission is requested (i.e., a true value is set to a necessity flag thereof) has been stored (step S14). Here, in cases where an affirmative determination is made, then at step S15, corresponding image data is transmitted to the server device 20 (the image management unit 2031). In cases where there exists no image data to be transmitted, processing returns to step S11.

At step S15, the server device 20 stores the transmitted image data in the image database 202A. In addition, it is determined whether a predetermined number of image data (the number of image data that should be collected by the server device 20) have been collected for each mesh, and in cases where it is determined that the predetermined number of image data have been collected, the partition table management unit 2032 updates the master partition table. That is, a false value is set to a necessity flag for each corresponding mesh.

Here, note that in this example, the update processing of the partial partition table and the transmission processing of the image data have been performed in succession, but the respective processings may be carried out at different timings.

As described above, according to the first embodiment, in the system in which the vehicle 10 collects image data and transmits them to the server device 20, a map indicating the necessity for transmission of the image data is transmitted to the vehicle, and the vehicle performs the transmission judgement (determination) of the image data based on the map. In particular, the necessity for transmission of the image data is represented by a binary value, so a high compressibility can be obtained. In addition, a target area is divided into segments, and only a necessary map is transmitted, so an amount of data can be reduced.

Second Embodiment

A second embodiment is an embodiment in which a version number is given to each partial partition table that is created and transmitted by the server device 20, and the version management of each partial partition table stored in the vehicle 10 is performed.

Figures 6A, 6B:
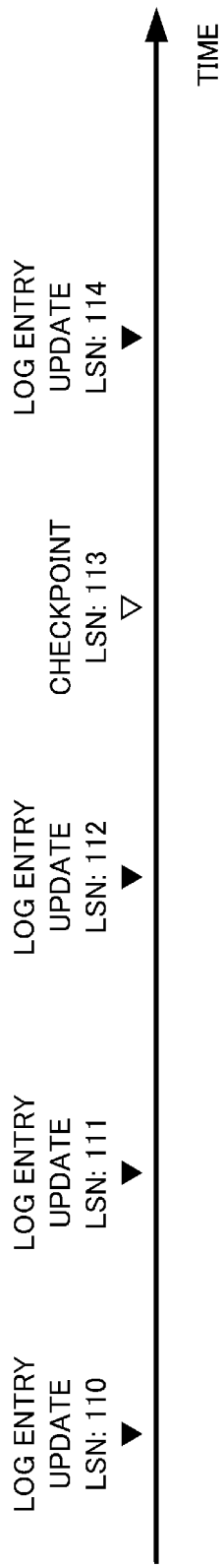
FIGS. 6A and 6B are views explaining log entries in a second embodiment of the present disclosure.

In the second embodiment, the partition table management unit 2032 does not update a master partition table stored in the partition table data base 202B in real time, but performs write-ahead logging. Specifically, in cases where an update to the master partition table occurs, the content of the update is recorded in a log entry, and at the timing at which the number of log entries (i.e., the number of updates) has reached a fixed number, the log entries are reflected on the database. FIG. 6A is a view explaining the update sequence of a log.

A different log entry is used for each segment. FIG. 6B is an example of log entries. A log entry is data that includes an LSN (Log Sequence Number, i.e., a version number), a mesh ID, and a necessity flag. The LSN is an integer value which is monotonously incremented each time an update occurs in a target segment. In cases where n segments are included in the master partition table (i.e., in cases where n partial partition tables exist), n LSNs exist.

When the number of log entries (updates) exceeds a predetermined value in a certain segment, reflection processing (checkpoint) to the database is carried out, so that the data generated before the checkpoint will be deleted from the log entry. In the example of FIG. 6A, only a log entry is updated until the LSN reaches 112, and a checkpoint (reflection to the database) occurs at a timing at which the LSN has become 113.

In the second embodiment, a partial partition table and an LSN are transmitted and received in a state where they are associated with each other.

Figure 7:
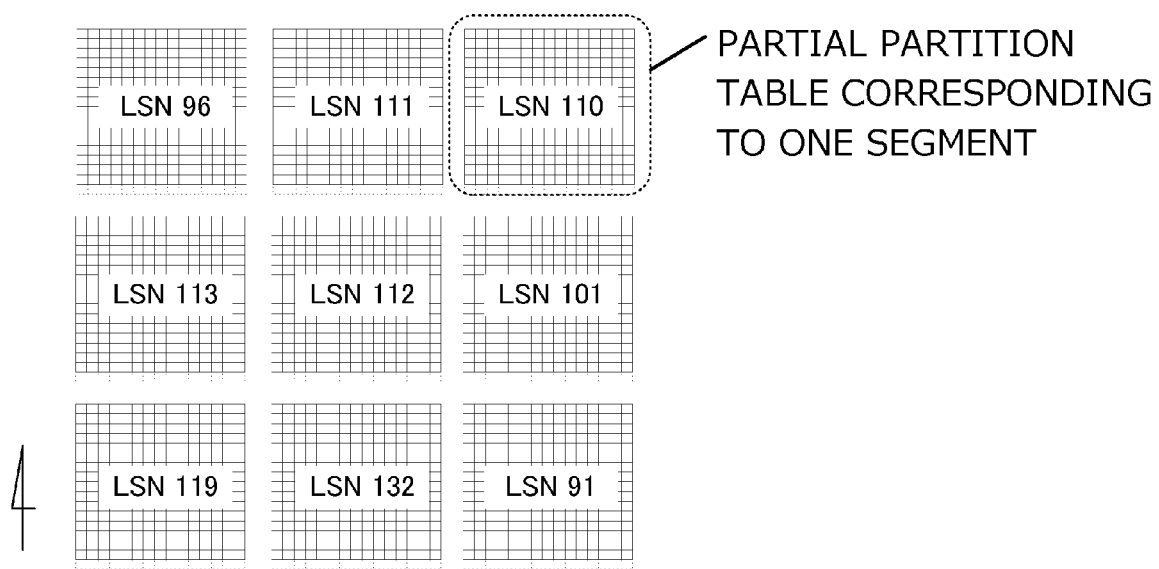
FIG. 7 is a view explaining a relation between segments and LSNs.

For example, when the server device 20 transmits a partial partition table to the vehicle 10 at step S12, the corresponding latest LSN is attached to the partial partition table. When storing the partial partition table, the vehicle 10 stores an LSN associated therewith at the same time. FIG. 7 is a schematic diagram illustrating a plurality of partial partition tables stored in the vehicle 10 and LSNs which are associated with the individual partial partition tables, respectively. Here, note that the plurality of partial partition tables are transmitted and received at different timings, and hence, as illustrated, the LSNs associated with the partial partition tables, respectively, become different numerical values.

Figure 8:
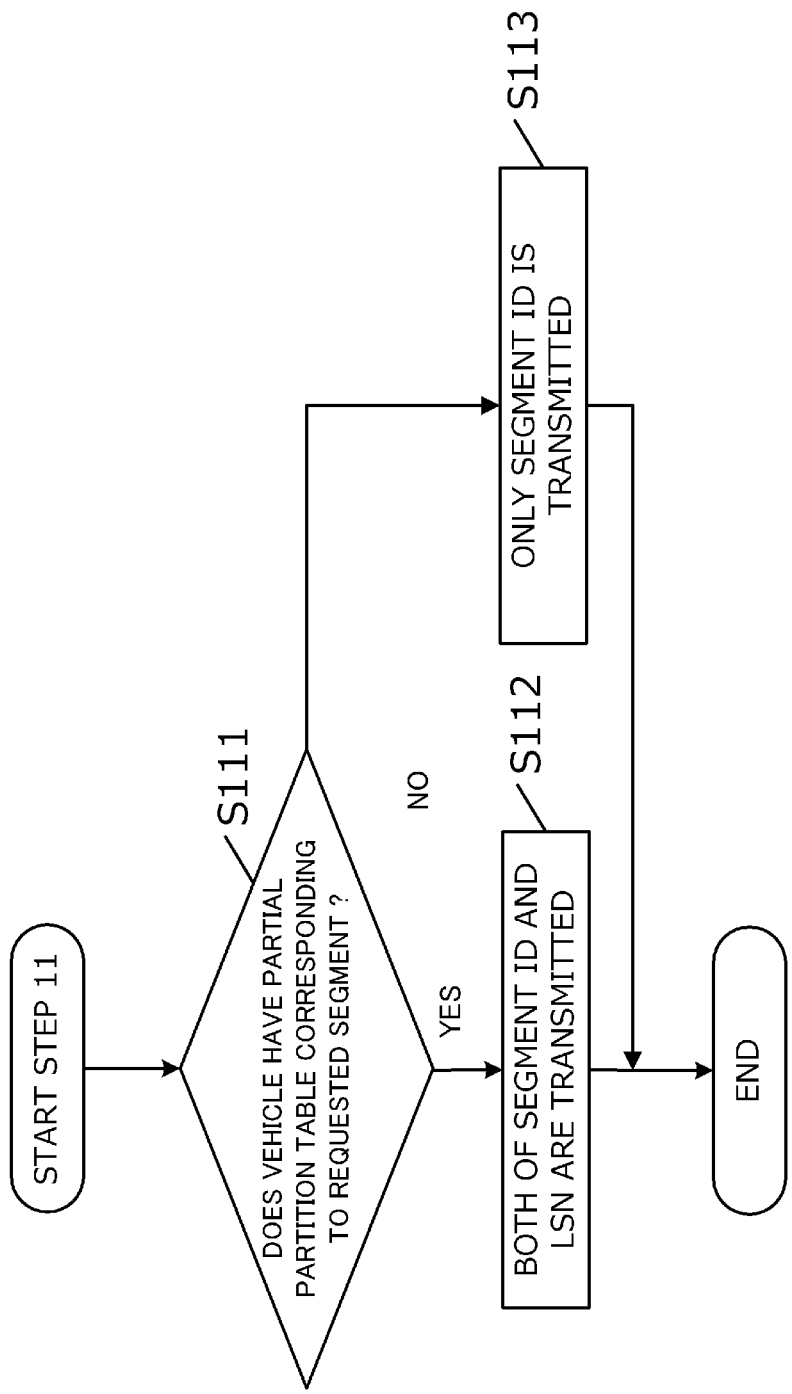
FIG. 8 is a flowchart explaining one processing in the second embodiment of the present disclosure.

FIG. 8 is a flowchart illustrating, in detail, processing (i.e., processing carried out at step S11) in which the vehicle 10 requests a partial partition table to the server device 20, in the second embodiment.

First, at step S111, it is determined whether the vehicle 10 has a partial partition table corresponding to a requested segment. In cases where an affirmative determination is made here, processing shifts to step S112, and a target segment ID and an LSN associated with the segment are transmitted to the server device 20. On the other hand, in cases where a negative determination is made, processing shifts to step S113, and only a segment ID is transmitted to the server device 20, as in the first embodiment.

Figure 9:
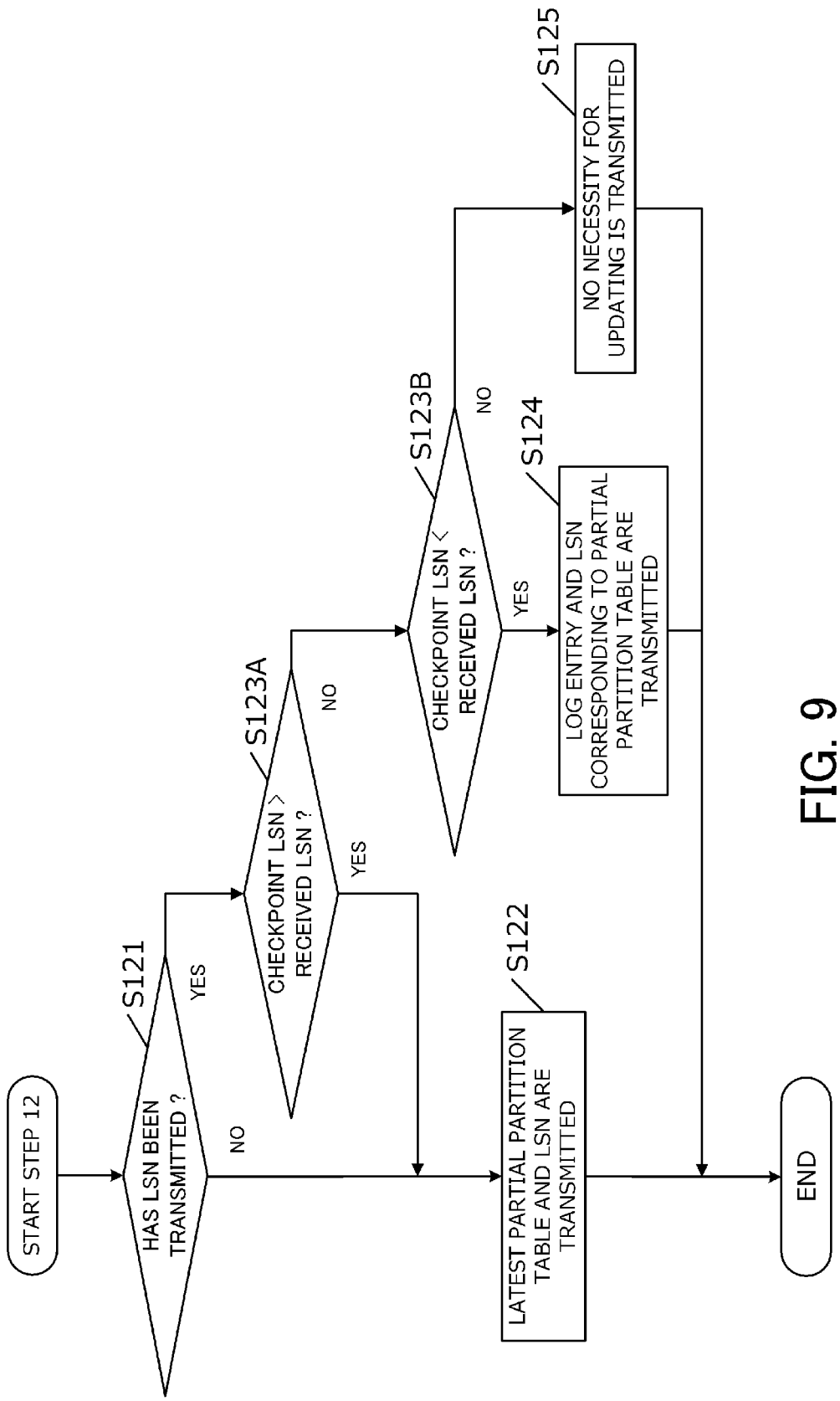
FIG. 9 is a flowchart another explaining processing in the second embodiment of the present disclosure.

FIG. 9 is a flowchart illustrating, in detail, processing (i.e., processing carried out at step S12) in which the server device 20 creates a partial partition table and transmits it to the vehicle 10, in the second embodiment.

First, at step S121, it is determined whether an LSN has been transmitted together with the ID of the requested segment from the vehicle 10. Here, in cases where no LSN has been transmitted, processing shifts to step S122, where the latest partial partition table and a corresponding LSN are transmitted.

In cases where the LSN is transmitted together with the ID of the requested segment, processing shifts to step S123A, where a comparison is made between the LSN at the time of the occurrence of the latest checkpoint and the received LSN. Here, in cases where the received LSN is smaller than the LSN at the latest checkpoint (YES at step S123A), it means that what is stored in the database is newer than the partial partition table held by the vehicle 10, so processing shifts to step S122, where the latest partial partition table and a corresponding LSN are transmitted.

In cases where the received LSN is larger than the LSN at the latest checkpoint (YES at step S123B), it means that what is stored in the database is older than the partial partition table held by the vehicle 10. This means that there exists an update which has not yet been reflected in the database. In this case, processing shifts to step S124, where a log entry and an LSN corresponding to the partial partition table are transmitted.

In cases where not the partial partition table itself but the log entry is transmitted to the vehicle 10, then at step S13 (FIG. 5), the vehicle 10 updates the stored partial partition table based on the log entry.

In cases where the values of both the LSNs are the same, processing shifts to step S125, where a message to the effect that there is no necessity for update is transmitted to the vehicle 10.

As described above, in the second embodiment, the version of each partial partition table stored in the vehicle 10 is managed by a numerical value indicating the version. According to such an embodiment, data update processing can be performed only in cases where a partial partition table stored in the vehicle 10 has become old, so unnecessary communication and processing can be reduced.

(Modification)

The above-mentioned embodiments are only some examples, and the present disclosure can be implemented while being changed or modified suitably without departing from the spirit and scope of the disclosure.

For example, in the second embodiment, there has been mentioned the example in which only an LSN is attached to a partial partition table, but information other than this may be attached to a partial partition table. For example, information indicating the necessity of a pretreatment and/or the quality of compression (mode information) may be attached, so that the vehicle 10 may carry out processing according to the mode information thus attached. Here, note that the mode information and the necessity flag may be put together. That is, the necessity flag is not a binary value, but may be an integer value, so that the integer value may be utilized as the mode information.

In addition, in the explanation of the above embodiments, each segment is divided into meshes in terms of geographical areas, but it may be further divided into highways and local streets, grade separations and side roads, or the like according to layers. In this case, based on the travel state of the vehicle, it may be specified to which layer a subject (own) vehicle belongs.

Moreover, in the second embodiment, when a partial partition table is updated, an LSN is transmitted from the vehicle 10 to the server device 20, but the transmission of the LSN may be performed at a timing at which image data is transmitted. According to such a configuration, it becomes possible for the server device 20 to quickly grasp that the received image data has been transmitted based on which version of the partial partition table.

Here, note that the processings, units and devices explained in this disclosure can be implemented in various combinations thereof, as long as technical inconsistency does not occur.

Moreover, the processing(s) explained as carried out by a single device may be carried out by a plurality of devices. Alternatively, the processing(s) explained as carried out by different devices may be carried out by a single device. In a computer system, whether each function of the disclosure is achieved by what kind of hardware configuration (server configuration) can be changed in a flexible manner.

The present disclosure can also be achieved by supplying a computer program to a computer which implements the functions explained in the above-mentioned embodiments, and by reading out and executing the program by means of one or more processors of the computer. Such a computer program may be supplied to the computer by a non-transitory computer readable storage medium which can be connected with a system bus of the computer, or may be supplied to the computer through a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. A data collection system comprising:
a server device; and
at least one probe vehicle, wherein the server device collects data obtained by the at least one probe vehicle,
the server device comprising:
a memory that stores a master map which is divided into a plurality of segments, each of the plurality of segments having a corresponding segment ID and including a plurality of unit ranges, wherein a necessity of data collection for each of the plurality of unit ranges included in each of the plurality of segments is indicated by a binary value; and
a server controller with a server processor programmed to determine a segment where a respective probe vehicle among the at least one probe vehicle is located based on a segment ID transmitted from the respective probe vehicle, extract a partial map corresponding to the determined segment from the stored master map, and transmit the extracted partial map to the respective probe vehicle;
the respective probe vehicle comprising:
a sensor that obtains data about an external environment of the respective probe vehicle; and
a vehicle controller with a vehicle processor programmed to transmit a request for the partial map with the segment ID to the server device, to receive the partial map from the server device, to identify a unit range where data collection is needed in the partial map received from the server device, and to transmit data obtained in the identified unit range, to the server device, wherein the server processor of the server controller is further programmed to:

update the stored master map according to a collection situation of data; and when the master map is updated, assign a version number to a partial map included in the updated master map, and transmit both of the partial map and the version number to the respective probe vehicle.

2. The data collection system according to claim 1, wherein the binary value is either a true value or a false value;

the master map is a map that assigns the true value to each of unit ranges among the plurality of unit ranges where data collection is needed and assigns the false value to each of unit ranges among the plurality of unit ranges where data collection is not needed; and the vehicle processor of the vehicle controller is programmed to, in cases where a certain unit range is assigned with the true value, transmit data obtained in the certain unit range, to the server device.

3. The data collection system according to claim 2, wherein the server processor of the server controller is further programmed to compress the partial map by a binary image compression method and transmit the compressed partial map to the respective probe vehicle.

4. The data collection system according to claim 1, wherein the server processor of the server controller is further programmed to compress the partial map by a binary image compression method and transmit the compressed partial map to the respective probe vehicle.

5. The data collection system according to claim 1, wherein the vehicle processor of the vehicle controller is further programmed to request the server device to transmit a partial map corresponding to a segment where the respective probe vehicle is located or will be located within a predetermined amount of time.

6. The data collection system according to claim 1, wherein the vehicle processor of the vehicle controller is further programmed to transmit a version number of a partial map held by the respective probe vehicle corresponding to a segment where the respective probe vehicle is located, to the server device; and the server processor of the server controller is further programmed to determine, based on the version number transmitted from the vehicle processor of the vehicle controller, whether an update of the partial map held by the respective probe vehicle is necessary.

7. The data collection system according to claim 6, wherein the vehicle processor of the vehicle controller is further programmed to transmit the version number of the partial map held by the respective probe vehicle simultaneously with transmitting data obtained in an area included in the partial map held by the respective probe vehicle, to the server device.

8. The data collection system according to claim 1, wherein the server controller does not update the master map in real time and instead performs write-ahead logging in which, when an update to a respective segment in the master map occurs, content of the update is recorded in a log entry, and at a time at which a number of log entries has reached a fixed number, the log entries are reflected in the respective segment of the master map;

the log entry includes a log sequence number which is an integer value that is monotonously incremented each time an update occurs in the respective segment of the master table; and the vehicle processor in the respective probe vehicle is further programmed to:

identify the segment ID to be sent to the server device along with the request for the partial map;

determine whether the partial map corresponding to the identified segment ID exists in the respective probe vehicle;

in response to determining that the partial map corresponding to the identified segment ID exists in the respective probe vehicle, transmit the request with both the identified segment ID and a log sequence number associated with the identified segment ID, to the server device; and in response to determining that the partial map corresponding to the identified segment ID does not exist in the respective probe vehicle, transmit the request with only the identified segment ID, to the server device.

9. A data collection method to be performed by a data collection system which includes a server device and at least one probe vehicle, wherein the server device collects data obtained by the at least one probe vehicle, the method comprising:

storing a master map which is divided into a plurality of segments, each of the plurality of segments having a corresponding segment ID and including a plurality of unit ranges, wherein a necessity of data collection for each of the plurality of unit ranges included in each of the plurality of segments is indicated by a binary value;

determining a segment where a respective probe vehicle among the at least one probe vehicle is located based on a segment ID transmitted from the respective probe vehicle, extracting a partial map corresponding to the determined segment from the stored master map, and transmitting the extracted partial map to the respective probe vehicle;

obtaining data by the respective probe vehicle; and transmitting, by the respective probe vehicle, a request for the partial map with the segment ID to the server device, receiving the partial map from the server device, identifying a unit range where data collection is needed in the partial map received from the server device, and transmitting data obtained in the identified unit range, to the server device, wherein the method further comprises:

updating the stored master map according to a collection situation of data; and when the master mag is updated, assigning a version number to a partial map included in the updated master map, and transmitting both of the partial map and the version number to the respective probe vehicle.

* * * * *